(12) United States Patent
Beck et al.

(10) Patent No.: US 7,617,337 B1
(45) Date of Patent: Nov. 10, 2009

(54) VOIP QUALITY TRADEOFF SYSTEM

(75) Inventors: Alexander Beck, Frenchs Forest (AU); Colin Blair, Westleigh (AU); Andrew W. Lang, Epping (AU); Paul McNamara, Killarney Heights (AU); David Thambiratnam, Ashfield (AU)

(73) Assignee: Avaya Inc., Basking Ridge, NJ (US)

( * ) Notice: Subject to any disclaimer, the term of this patent is extended or adjusted under 35 U.S.C. 154(b) by 425 days.

(21) Appl. No.: 11/671,733

(22) Filed: Feb. 6, 2007

(51) Int. Cl.
G06F 3/00 (2006.01)

(52) U.S. Cl. .................. 710/11; 370/229; 370/230; 370/232

(58) Field of Classification Search .................. 370/229, 370/230, 230.1; 379/90.01, 93.01, 93.26, 379/93.28, 93.31; 710/1, 8, 11
See application file for complete search history.

(56) References Cited

U.S. PATENT DOCUMENTS

| | | | |
|---|---|---|---|
| 4,791,660 A | 12/1988 | Oye et al. |
| 5,067,127 A | 11/1991 | Ochiai |
| 5,206,903 A | 4/1993 | Kohler et al. |
| 5,506,872 A | 4/1996 | Mohler |
| 5,594,740 A | 1/1997 | LaDue |
| 5,604,786 A | 2/1997 | Engelke et al. |
| 5,724,405 A | 3/1998 | Engelke et al. |
| 5,802,058 A | 9/1998 | Harris et al. |
| 5,828,747 A | 10/1998 | Fisher et al. |
| 5,905,793 A | 5/1999 | Flockhart et al. |
| 5,933,425 A | 8/1999 | Iwata |
| 5,946,618 A | 8/1999 | Agre et al. |
| 5,953,312 A | 9/1999 | Crawley et al. |
| 5,961,572 A | 10/1999 | Craport et al. |
| 5,982,873 A | 11/1999 | Flockhart et al. |
| 6,002,933 A | 12/1999 | Bender et al. |
| 6,021,178 A | 2/2000 | Locke et al. |
| 6,038,214 A | 3/2000 | Shionozaki |
| 6,058,163 A | 5/2000 | Pattison et al. |
| 6,061,431 A | 5/2000 | Knappe et al. |
| 6,067,300 A | 5/2000 | Baumert et al. |
| 6,073,013 A | 6/2000 | Agre et al. |
| 6,088,732 A | 7/2000 | Smith et al. |
| 6,122,665 A | 9/2000 | Bar et al. |
| 6,163,607 A | 12/2000 | Bogart et al. |

(Continued)

FOREIGN PATENT DOCUMENTS

WO   WO 91/14278   9/1991

(Continued)

OTHER PUBLICATIONS

Application Note, Emergency 911 In Packet Networks, http:www.fastcomm.com/NewWeb/solutions/e911.html, Sep. 5, 2001, FastComm Communications Corporation, 3 pgs.

(Continued)

*Primary Examiner*—Chi H Pham
*Assistant Examiner*—Weibin Huang
(74) *Attorney, Agent, or Firm*—Sheridan Ross P.C.

(57) ABSTRACT

The present invention provides methods and systems for improving VoIP quality in speech and similar communications. More specifically, various lower limits for network performance may be identified and in the event that the communication network begins performing below the lower limits a buffered conversation may be employed in an attempt to improve conversation quality.

22 Claims, 4 Drawing Sheets

U.S. PATENT DOCUMENTS

| | | |
|---|---|---|
| 6,173,053 B1 | 1/2001 | Bogart et al. |
| 6,185,527 B1 | 2/2001 | Petkovic et al. |
| 6,192,122 B1 | 2/2001 | Flockhart et al. |
| 6,249,757 B1 | 6/2001 | Cason |
| 6,256,300 B1 | 7/2001 | Ahmed et al. |
| 6,374,302 B1 | 4/2002 | Galasso et al. |
| 6,381,472 B1 | 4/2002 | LaMedica, Jr. et al. |
| 6,381,639 B1 | 4/2002 | Thebaut et al. |
| 6,421,425 B1 | 7/2002 | Bossi et al. |
| 6,434,628 B1 | 8/2002 | Bowman-Amuah |
| 6,453,022 B1 | 9/2002 | Weinman, Jr. |
| 6,463,470 B1 | 10/2002 | Mohaban et al. |
| 6,463,474 B1 | 10/2002 | Fuh et al. |
| 6,490,343 B2 | 12/2002 | Smith, Jr. et al. |
| 6,498,791 B2 | 12/2002 | Pickett et al. |
| 6,502,131 B1 | 12/2002 | Vaid et al. |
| 6,526,140 B1 | 2/2003 | Marchok et al. |
| 6,529,475 B1 | 3/2003 | Wan et al. |
| 6,529,499 B1 | 3/2003 | Doshi et al. |
| 6,532,241 B1 | 3/2003 | Ferguson et al. |
| 6,546,082 B1 | 4/2003 | Alcendor et al. |
| 6,578,077 B1 | 6/2003 | Rakoshitz et al. |
| 6,601,101 B1 | 7/2003 | Lee et al. |
| 6,628,611 B1 | 9/2003 | Mochizuki |
| 6,647,270 B1 | 11/2003 | Himmelstein |
| 6,668,042 B2 | 12/2003 | Michaelis |
| 6,678,250 B1 | 1/2004 | Grabelsky et al. |
| 6,725,128 B2 | 4/2004 | Hogg et al. |
| 6,754,710 B1 | 6/2004 | McAlear |
| 6,760,312 B1 | 7/2004 | Hitzeman |
| 6,760,774 B1 | 7/2004 | Soumiya et al. |
| 6,765,905 B2 | 7/2004 | Gross et al. |
| 6,778,534 B1 | 8/2004 | Tal et al. |
| 6,792,092 B1 | 9/2004 | Michalewicz |
| 6,798,751 B1 | 9/2004 | Voit et al. |
| 6,807,564 B1 | 10/2004 | Zellner et al. |
| 6,857,020 B1 | 2/2005 | Chaar et al. |
| 6,914,964 B1 | 7/2005 | Levine |
| 6,954,435 B2 | 10/2005 | Billhartz et al. |
| 6,964,023 B2 | 11/2005 | Maes et al. |
| 6,973,033 B1 | 12/2005 | Chiu et al. |
| 6,988,133 B1 | 1/2006 | Zavalkovsky et al. |
| 7,003,574 B1 | 2/2006 | Bahl |
| 7,010,097 B2 | 3/2006 | Zellner et al. |
| 7,010,581 B2 | 3/2006 | Brown et al. |
| 7,031,311 B2 | 4/2006 | MeLampy et al. |
| 7,031,327 B2 | 4/2006 | Lu |
| 7,046,646 B2 | 5/2006 | Kilgore |
| 7,075,922 B2 | 7/2006 | Mussman et al. |
| 7,076,540 B2 | 7/2006 | Kurose et al. |
| 7,076,568 B2 | 7/2006 | Philbrick et al. |
| 7,099,440 B2 | 8/2006 | Michaelis |
| 7,103,542 B2 | 9/2006 | Doyle |
| 7,124,205 B2 | 10/2006 | Craft et al. |
| 7,170,977 B2 | 1/2007 | Doherty et al. |
| 7,177,945 B2 | 2/2007 | Hong et al. |
| 7,184,434 B2 | 2/2007 | Ganti et al. |
| 7,212,969 B1 | 5/2007 | Bennett |
| 7,251,640 B2 | 7/2007 | Baumard |
| 7,257,120 B2 | 8/2007 | Saunders et al. |
| 7,260,439 B2 | 8/2007 | Foote et al. |
| 7,290,059 B2 | 10/2007 | Yadav |
| 7,359,979 B2 * | 4/2008 | Gentle et al. ............... 709/231 |
| 7,362,745 B1 | 4/2008 | Cope et al. |
| 7,474,627 B2 * | 1/2009 | Chheda et al. ............. 370/252 |
| 7,496,661 B1 * | 2/2009 | Morford et al. ............ 709/224 |
| 2001/0039210 A1 | 11/2001 | St-Denis |
| 2002/0085703 A1 | 7/2002 | Proctor |
| 2002/0091843 A1 | 7/2002 | Vaid |
| 2002/0105911 A1 | 8/2002 | Pruthi et al. |
| 2002/0143971 A1 | 10/2002 | Govindarajan et al. |
| 2002/0152319 A1 | 10/2002 | Amin et al. |
| 2002/0176404 A1 | 11/2002 | Girard |
| 2003/0002650 A1 | 1/2003 | Gruchala |
| 2003/0016653 A1 | 1/2003 | Davis |
| 2003/0086515 A1 | 5/2003 | Trans et al. |
| 2003/0120789 A1 | 6/2003 | Hepworth et al. |
| 2003/0223431 A1 | 12/2003 | Chavez et al. |
| 2003/0227878 A1 | 12/2003 | Krumm-Heller |
| 2004/0073641 A1 | 4/2004 | Minhazuddin et al. |
| 2004/0073690 A1 | 4/2004 | Hepworth et al. |
| 2005/0064899 A1 | 3/2005 | Angelopoulos et al. |
| 2005/0180323 A1 * | 8/2005 | Beightol et al. ............. 370/230 |
| 2005/0186933 A1 | 8/2005 | Trans |
| 2005/0261035 A1 | 11/2005 | Groskreutz et al. |
| 2005/0278148 A1 | 12/2005 | Bader et al. |
| 2006/0067486 A1 | 3/2006 | Zellner et al. |
| 2006/0069779 A1 | 3/2006 | Sundqvist et al. |
| 2007/0103317 A1 | 5/2007 | Zellner et al. |
| 2007/0133403 A1 | 6/2007 | Hepworth et al. |
| 2008/0151886 A1 | 6/2008 | Gentle et al. |
| 2008/0151898 A1 | 6/2008 | Gentle et al. |
| 2008/0151921 A1 | 6/2008 | Gentle et al. |

FOREIGN PATENT DOCUMENTS

| | | |
|---|---|---|
| WO | WO 98/46035 | 10/1998 |
| WO | WO 99/51038 | 10/1999 |
| WO | WO 00/41090 | 7/2000 |
| WO | WO 01/26393 | 4/2001 |
| WO | WO 01/75705 | 10/2001 |
| WO | WO 02/00316 | 1/2002 |

OTHER PUBLICATIONS

Baker (Editor), "Requirements for IP Version 4 Routers", RFC 1812, Jun. 1995, 175 pages.

Benjamin W. Wah, et al., "A Survey of Error-Concealment Schemes for Real-Time Audio and Video Transmissions over the Internet," Department of Electrical and Computer Engineering and the Coordinate Science Laboratory, University of Illinois at Urbana-Champaign, Proc. IEEE Int'l Symposium on Multimedia Software Engineering, Dec. 2000.

Bernet et al., "Specification of the Null Service Type", RFC 2997, Nov. 2000, 12 pages.

Bernet, "Format of the RSVP DCLASS Object", RFC 2996, Nov. 2000, 9 pages.

Berney et al., "A Framework for Integrated Services Operation over Diffserv Networks", RFC 2998, Nov. 2000, 29 pages.

Braden et al. "Resource ReSerVation Protocol (RSVP)", RFC 2205, Sep. 1997, 6 pages.

Brown, I. Internet Engineering Task Force, Securing Prioritised Emergency Traffic, http://www.iepscheme.net/docs/draft-brown-ieps-sec-00.txt, Jul. 5, 2001, pp. 1-12.

Carlberg, Ken. Internet Engineering Task Force, Framework for Supporting IEPS in IP Telephony, http://www.iepscheme.net/docs/draft-carlberg-ieps-framework-01.tex, Jul. 4, 2001, pp. 1-24.

Chan et al., "COPS Usage for Policy Provisioning (COPS-PR)", RFC 3084, Mar. 2001, 32 pages.

Cisco IP Phone 7960, eLearning Tutorial, at www.cisco.com/warp/public/779/largeent/avvid/products/7960/7960_show_using_help.htm, printed Mar. 17, 2006, 17 pages.

Cisco Systems, "Cisco Emergency Responder Version 1.1 Data Sheet" (Oct. 2001), 5 pages, copyright 1992-2001.

Ejaz Mahfuz; "Packet Loss Concealment for Voice Transmission Over IP Networks" (2001) (Master thesis, Department of Electrical Engineering, McGill University).

Floyd et al., "Random Early Detection Gateways for Congestion Avoidance", IEEE/ACM Transaction on Networking, Aug. 1993, 22 pages.

Geeta Desai Chennubhotla, "Embedded Systems: Rough start, but voice market growing," EE Times, at http://www.eetimes.com/in_focus/embedded_systems/EOG20020503S0067 (May 6, 2002).

Getting Started with the Cisco IP Phone 7960/7940, pp. 1-1 to 1-4, date unknown.

Government Emergency Telecommunications Service (GETS), "White Paper on IP Teleponhy A Roadmap to Supporting GETS in IP Networks," Apr. 27, 2000, Science Applications International Corporation, pp. 1-32.

Grigonis, Computer Telephony Encyclopedia, pp. 268-277 (2000).

Handley et al., "SIP: Session Initiation Protocol", RFC 2543, Mar. 1999, 81 pages.

Herzog et al., "COPS Usage for RSVP", RFC 2749, Jan. 2000, 16 pages.

Huai-Rong Shao et al., "A New Framework for Adaptive Multimedia over the Next Generation Internet," Microsoft Research China, date unknown 4 pages.

IEEE Standards for Information Technology—Telecommunications and information exchange between systems—Local and metropolitan area networks—Common specifications—Part 3: Media Access Control (MAC) Bridges, LAN/MAN Standards Committee of the IEEE Computer Society, ANSI/IEEE Std 802.1D (1998).

IEEE Standards for Local and Metropolitan Area Networks: Virtual Bridged Local Area Networks, The Institute of Electrical and Electronics Engineers, IEEE Std 802.1Q-1998 (Mar. 8, 1999).

International Emergency Preference Scheme (IEPS), http://www.iepscheme.net/, Jun. 16, 2000, pp. 1-2.

International Engineering Consortium, "Silence Suppression and Comfort Noise Generation" at http://www.iec.org/online/tutorials/voice_qual/topic07.html (Jul. 1, 2002).

International Telecommunication Union; "General Aspects of Digital Transmission Systems: Coding of Speech at 8kbit/s Using Conjugate-Structure Algebraic-Code-Excited Linear-Prediction" (CS-ACELP) ITU-T Recommendation G.729 (Mar. 1996).

ITU, "Packet-based multimedia communications systems", H. 323, Feb. 1998, 125 pages.

J. Heinanen et al., "Assured Forwarding PHB Group," Network Working Group, Category: Standards Track (Jun. 1999).

K. Nichols, Cisco Systems, RFC 2474, Definition of Differentiated Services Field in IPv4 & IPv6 Headers, Dec. 1998.

Kathy Lynn Hewitt, Desktop Video Conferencing: A Low Cost and Scalable Solution to Distance Education, "Chapter 2—Internet Conferencing Protocols" thesis submitted to North Carolina State University (1997), at http://www2.ncsu.edu/eos/service/ece/project/succeed_info/klhewitt/thesis/toc.html.

McCloghrie et al., "Structure of Policy Provisioning Information (SPPI)", RFC 3159, Aug. 2001, 38 pages.

PacketCable, Cable Labs, http://www.packetcable.com, copyright 2000-2002.

PacketCableTM Dynamic Quality-of-Service Specification PKT-SP-DQOS-102-000818, 2000, Cable Television Laboratories, Inc., 211 pages.

Paul Roller Michaelis, "Speech Digitization and Compression", Int'l Encyclopedia of Ergonomics and Human Factors (W. Warkowski ed., Taylor & Francis 2001).

Peter Parnes, "Real-time Transfer Protocol (RTP)" (Sep. 8, 1997), at www.cdt.luth.se/~peppar/docs/lic/html/node166.html.

S. Blake et al., "An Architecture for Differentiated Services," Networks Working Group, Category: Informational (Dec. 1998).

Sangeun Han et al., "Transmitting Scalable Video over a DiffServ network," EE368C Project Proposal (Jan. 30, 2001).

Schulzrinne. Providing Emergency Call Services for SIP-based Internet Telephony, http//www.softarmor.com/sipping/drafts/draft-schulzrinne-sip-911-00.txt., Jul. 13, 2000, pp. 1-13.

TechTarget, "voice activation detection," at http://searchnetworking.te...m/sDefinition/0,,sid7_gci342466.00.html (Jul. 1, 2002).

V. Jacobson et al., "An Expedited Forwarding PHB," Network Working Group, Category: Standards Track (Jun. 1999).

Wroclawski, "The use of RSVP with IETF Integrated Services", RFC 2210, Sep. 1997, 31 pages.

"Packet Loss and Packet Loss Concealment Technical Brief," Nortel Networks at http://www.nortelnetworks.com (2000).

"Telogy Networks' Voice Over Packet White Paper," Telogy Networks, Inc., available at http://www.telogy.com/our_products/golden_gateway/VOPwhite.html (Jan. 1998).

"Voice over packet: An assessment of voice performance on packet networks white paper," Nortel Networks, Publication No. 74007.25/09-01, at http://www.nortelnetworks.com (2001).

"Access for 9-1-1 and Telephone Emergency Services," American with Disabilities Act, U.S. Deparment of Justice (Jul. 15, 1998), available at http://www.usdoj.gov/crt/ada/911ta.htm, 11 pages.

Schulzrinne, "Emergency Call Services for SIP-based Internet Telephony," Internet Engineering Task Force (Mar. 25, 2001), pp. 1-17.

"Comments of the National Association of State Utility Consumer Advocates," filed with the Federal Communications Commission, Washington, D.C. (May. 28, 2004), pp. 1-74.

"NANPA ANI II Digits," NeuStar, Inc. (2003), available at http://www.nanpa.com/number_resource_info/ani_ii_assignments.html, 5 pages.

Le Boudec, Jean-Yves et al., slideshow entitled "Quality of Service in IP Networks (2)," Queue Management (undated), pp. 1-30.

RADVision, "SIP: Protocol Overview," (2001), pp. 1-16.

* cited by examiner

VOIP QUALITY TRADEOFF SYSTEM

FIELD OF THE INVENTION

The invention relates generally to an Internet Protocol Network and methods for transmitting speech and other types of signals during periods of decreased network performance.

BACKGROUND

It is a problem in Internet Protocol (IP) Networks that some of the data packets transmitted by one communication device may fail to arrive at their intended destination. Transmission/transportation level protocols such as the Transmission Control Protocol (TCP) can be used to transmit data across the IP network. The TCP is a virtual circuit protocol that is one of the core protocols of the IP suite and is often referred to as TCP/IP. Endpoints connected to an IP network can employ TCP to create connections to one another, then use those connections to exchange streams of data in audio, text, video, or other media. The TCP protocol guarantees reliable and in-order delivery of data from the sender to the receiver. TCP currently supports many of the Internet's most popular application protocols and resulting applications, including the World Wide Web, e-mail, and Secure Shell.

Lossless transportation protocols such as TCP permit receiving devices to request that missing packets be retransmitted. Unfortunately, this retransmission process often results in long pauses in the data stream, as well as data transmission latencies of more than several hundred milliseconds. For these reasons, TCP/IP is not commonly used in communication applications where real-time communications are desired, such as telephony applications.

For these reasons, Voice over Internet Protocol (VoIP) systems commonly use a transmission/transportation scheme called the User Datagram Protocol (UDP). UDP and TCP are the two main transport-level Internet protocols. The UDP protocol does not suffer from the pauses or transmission latencies that would be seen if TCP/IP were used for VoIP, mainly because retransmission of missing packets is not carried out by UDP. Instead, UDP does not provide the reliability and ordering guarantees that TCP does, because UDP attempts to transport data quickly from endpoint to endpoint for real-time applications. Instead, IP networks try to reduce VoIP packet loss by assigning a higher priority to UDP packets. Additionally, many VoIP telephones include packet loss concealment algorithms that try to trick the human ear by inserting extrapolated data as a placeholder for the lost packets. Unless the level of packet loss becomes extreme, the use of high quality packet loss concealment algorithms allows UDP to be an acceptable transportation protocol for two-way voice conversations. However, when an IP network becomes congested due to high volumes of traffic, network bandwidth availability tends to decrease. The number of lost packets begins to increase as the network bandwidth availability begins to decrease. If too many packets are lost or received in the wrong order, a VoIP conversation can become unintelligible and frustrating for both parties.

Transportation protocols, such as UDP-type protocols, that are designed to eliminate latency between transmission and reception of a signal are typically designed to forego some amount of transmission quality. On the other hand, protocols such as TCP-type protocols are designed to increase transmission quality at the expense of latency.

IP telephony is often conducted over network connections that vary in quality, in aspects such as delay, packet loss, bandwidth, and so on. There are a number of ways to cope with these problems, but the solutions are generally predicated on the assumption that the network problems are minor and/or temporary. When the network encounters a larger and/or longer-term problem, conversations using UDP-type transportation protocols can become fragmented and unintelligible. As a result, users will begin to talk over the top of each other and the ability to transfer information via the conversation becomes almost impossible.

Such problems may be considered trivial for casual conversations; however, for military applications or other applications where the accurate dissemination of information is of the utmost importance, such problems may carry serious consequences. Particularly in military applications, where network bandwidth may be substantially degraded and subject to large fluctuations (due to field conditions, mobility, enemy actions, etc.), callers have a strong need to communicate clear instructions or information even at the cost of some delay.

There have been some attempts to address such problems in the prior art. For example, U.S. Patent Application No. 20050180323 to Beightol et al., the entire contents of which are incorporated herein by reference, describes using a TCP-like connection protocol to allow missing packets in a VoIP connection to be restored. The application describes adding extra information to standard UDP packets to allow TCP-like retransmission. Extra information is added to the standard UDP packet headers since it is observed that changing a connection between TCP and UDP is not permitted. One problem with this particular solution is that it applies only to unidirectional conversations, where Interactive Voice Response (IVR) units are involved. The unidirectional conversation allows for larger than normal delays as a sacrifice for clarity. However, this particular solution does not address the issue of talk-over since it is designed for unidirectional communications instead of bidirectional communications. Additionally, the TCP-like transportation is not designed to cope with a network connection whose bandwidth is substantially below that required for normal speech.

SUMMARY

These and other needs are addressed by various embodiments and configurations of the present invention. The present invention is directed generally to a system, device, and method for improving VoIP communications.

In accordance with one embodiment of the present invention, a method is provided for communicating between communication devices over an IP-based communication network, especially in a bidirectional conversation. The method comprises the steps of:

(a) transmitting data packets from a first communication device to a second communication device using a transportation protocol that does not retransmit lost and/or damaged data packets;

(b) determining performance parameters associated with performance of the communication network;

(c) determining that the performance parameters do not meet a threshold of performance for the communication network;

(d) in response to identifying that the performance parameters do not meet the threshold of performance, storing a number of data packets in a buffer prior to providing the data packets to an intended recipient; and (e) indicating to at least one of the first and second communication device that a number of data packets are being stored in the buffer.

A number of transportation protocols may be employed in accordance with embodiments of the present invention. The transportation protocols employed during periods of adequate network performance may include protocols designed for real-time transmission of signals. Examples of such protocols include UDP-like transportation protocols that do not retransmit lost and/or damaged data packets. Rather, UDP-like transportation protocols attempt to interpolate or otherwise compensate for lost and/or damaged data packets. Alternatively, during periods of inadequate network performance, transportation protocols that sacrifice real-time or near real-time transmission for quality may be employed. Examples of such protocols that provide higher signal transmission quality include TCP-like transportation protocols. TCP-like transportation protocols afford the option of retransmission of lost and/or damaged data packets rather than relying upon interpolation and compensation algorithms. The TCP-like transportation protocols sacrifice quickness for signal quality and accuracy.

As a part of changing to a TCP-like transportation protocol, data packets may be buffered prior to and after transmission across the communication network. Data packets may be buffered such that user perceivable segments are formed for transmission and prior to being presented to a user. A user perceivable segment is completely reconstructed prior to being provided to a user. Such a provision ensures that a conversation is intelligible, albeit at the expense of possible delays due to reconstruction of the segment.

In one embodiment, the invention may be used to change transportation protocols during a conversation or communication session. The communication session may be bidirectional, in which case both parties to the communication session may need to be aware that the transportation protocol has changed such that data packets are being buffered. The participants may be notified via user outputs on their respective communication devices. Additionally, the participants may be shown the status of the buffering, thereby allowing the participants to know when the other party is done talking and all of the data has been received. This helps eliminate the problem of talk over because each participant knows when the other participant is talking, even if the participant has not yet received any data from the talking participant due to the data being buffered. Therefore, users can successfully participate in a bidirectional communication session even when using a TCP-like transportation protocol that inherently introduces delays in the transmission of data between participants.

The performance parameters associated with the communication network may be monitored in a couple of different ways. In one embodiment, the performance parameters may be automatically monitored to determine when the buffer should be used. In an alternative embodiment, such monitoring of the performance parameters of the network may be user initiated. Of course, a combination of the two methods may also be employed.

In accordance with another embodiment, a method is provided for communicating between communication devices over an IP-based network. The method generally comprises the steps of:

(a) transmitting data packets from a first communication device to a second communication device using a transportation protocol that allows retransmission of lost or damaged data packets;

(b) storing a number of data packets in a buffer prior to providing the data packets to an intended recipient;

(c) determining performance parameters associated with performance of the communication network;

(d) determining that the performance parameters at least one of meet and exceed a threshold of performance for the communication network; and (e) in response to identifying that the performance parameters at least one of meet and exceed the threshold of performance, discontinuing use of the buffer.

This particular embodiment is designed to change transportation protocols in response to the communication network regaining a certain amount of bandwidth and therefore being able to provide better performance. When the network performance rises above certain thresholds, a slower quality based transportation protocol that allows for retransmission of lost or damaged data packets may be changed in favor of a transportation protocol that does not allow retransmission of lost or damaged data packets. The transportation protocol that does not allow retransmission of lost or damaged data packets, in one embodiment, is better able to provide real-time or near real-time data transmission across the communication network.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a switch(es) and/or server(s), the invention is not limited to use with any particular type of communication system or configuration of system elements. Those skilled in the art will recognize that the disclosed techniques may be used in any communication application in which it is desirable to change between various communication protocols during a bidirectional VoIP conversation.

Figure 1:
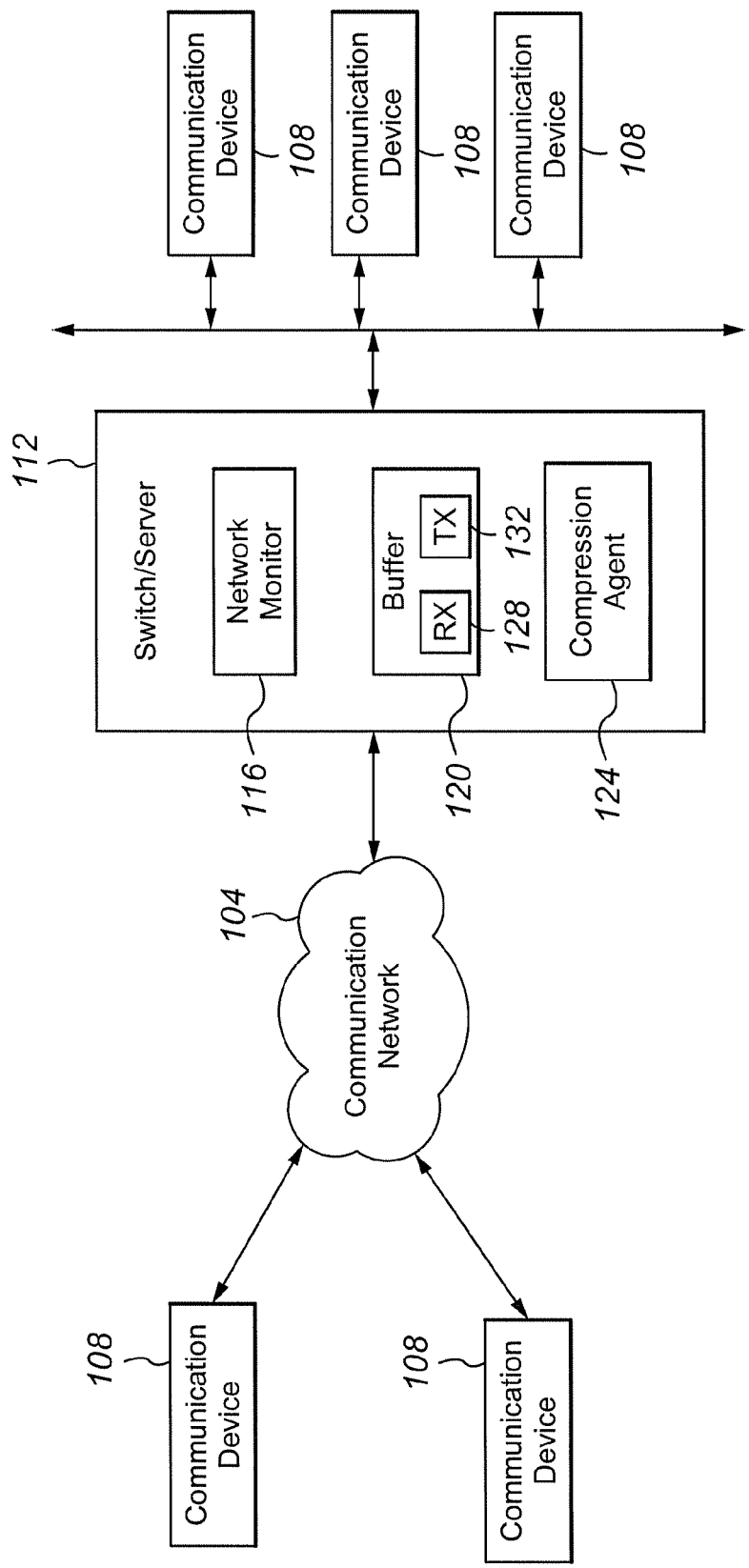
FIG. 1 is a block diagram depicting a communication system in accordance with embodiments of the present invention.

Referring initially to FIG. 1, a communication system 100 will be described in accordance with at least some embodiments of the present invention. The communication system 100 generally comprises a communication network 104, one or more communication devices 108, and a switch/server 112 including a network monitor 116, a buffer 120 having a transmission portion 128 and a receiving portion 132, and a compression agent 124.

The communication network 104 may comprise any type of information transportation medium and may use any type of protocols to transport messages between endpoints. The communication network 104 may include wired and/or wireless communication technologies. The Internet is an example of the communication network 104 that constitutes and IP network consisting of many computers and other communication devices 108 located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), and any other type of packet-switched or circuit-switched network known in the art. In addition, it can be appreciated that the communication network 104 need not be limited to any one network type, and instead may be comprised of a number of different networks and/or network types. The communication network 104 may further include routers (not shown) and proxy servers (not shown) for transmitting data across the communication network 104.

The communication devices 108 may be packet-switched and/or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, conventional wired or wireless telephones, cellular phones, Personal Digital Assistants (PDAs), and the like.

In accordance with one embodiment, the communication devices 108 are adapted to do their own buffering and network performance or health detection. Typically such devices will send media directly to each other during a conversation, and they will have the best access to information about how well the end-to-end communication is working. A network monitor may reside in the communication device 108 that can be used and may have information about the overall network performance that can allow communication devices 108 to anticipate problems.

A switch/server 112 in accordance with embodiments of the present invention, may comprise a communication server or other dedicated processor that functions to provide services to client devices (e.g., communication devices 108). The switch/server 112 may comprise a Private Branch eXchange (PBX) (or other local switching office), which interconnects some of the communication devices 108 to the communication network 104. Alternatively, the switch/server 112 may comprise a dedicated server for transferring and/or connecting calls to/from the communications devices 108 connected thereto.

The term "switch" and/or "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

The switch/server 112 may include a network monitor 116 capable of monitoring various parameters related to the performance of the communication network 104. Examples of performance parameters that may monitored by the network monitor 116 include, without limitation, jitter, packet loss, packet delay, bandwidth availability, or other parameters related to the quality of service of the communication network 104.

For instances where the performance of the communication network 104 is identified by the network monitor 116 as being below a particular threshold, a switch/server 112 may further include a buffer 120. The buffer 120 can be used to buffer incoming and/or outgoing packets of data into larger conversation segments when the performance of the communication network 104 is below a certain predetermined threshold. In other words, when the communication network 104 performance becomes compromised, data being sent from a communication device 108 connected directly to the switch/server 112 may be temporarily stored and formed into segments on the transmission buffer 128 before the segments are transmitted to a destination communication device 108, which may or may not be connected directly to the switch/server 112. Also, data being transmitted from a communication device 108 not connected directly to the switch/server 112 may be temporarily stored and formed into segments on the receiving buffer 132 before the segments are transmitted to the communication device 108 connected directly to the switch/server 112. In one embodiment, both the transmitting communication device 108 and the receiving communication device 108 are connected to different switch/servers 112 and data packets are buffered at each switch/server 112 during periods of poor network 104 performance.

In accordance with embodiments of the present invention, data may be buffered into segments that are long enough to be replayed to the recipient in comprehensible segments (e.g., several seconds long). In one configuration, silence detection methods, typically employed to save bandwidth, may be employed to break up conversation segments into comprehensible chunks. Of course, other speech and data analysis tools may also be employed to determine how large segments should be before they are transmitted to the recipient.

The switch/server 112 may further include a compression agent 124 that includes a number of compression/decompression algorithms. The compression agent 124 may be used differently depending upon whether the communication network 104 is performing satisfactorily or not. For example, if the communication network 104 is performing properly and there are no serious problems with packet loss, delay, bandwidth, etc., then the compression agent 124 may employ very minimal compression of packets passing through the switch/server 112 in an attempt to minimize the conversation latency. Alternatively, if the communication network 104 is not meeting performance thresholds, then the compression agent 124 may compress data packets while they are in the buffer 120. The incorporation of compression techniques during times when data is being buffered may provide for an increased speech quality and error rates. The improvement in data compression is made possible by the fact that when data is being buffered, compression algorithms work much better when the have access to "future" data relative to a current packet.

It should be emphasized that the configuration of the server 112, user communication devices 108, and other elements as shown in FIG. 1 is for purposes of illustration only and should not be construed as limiting the invention to any particular arrangement of elements.

Figure 2:
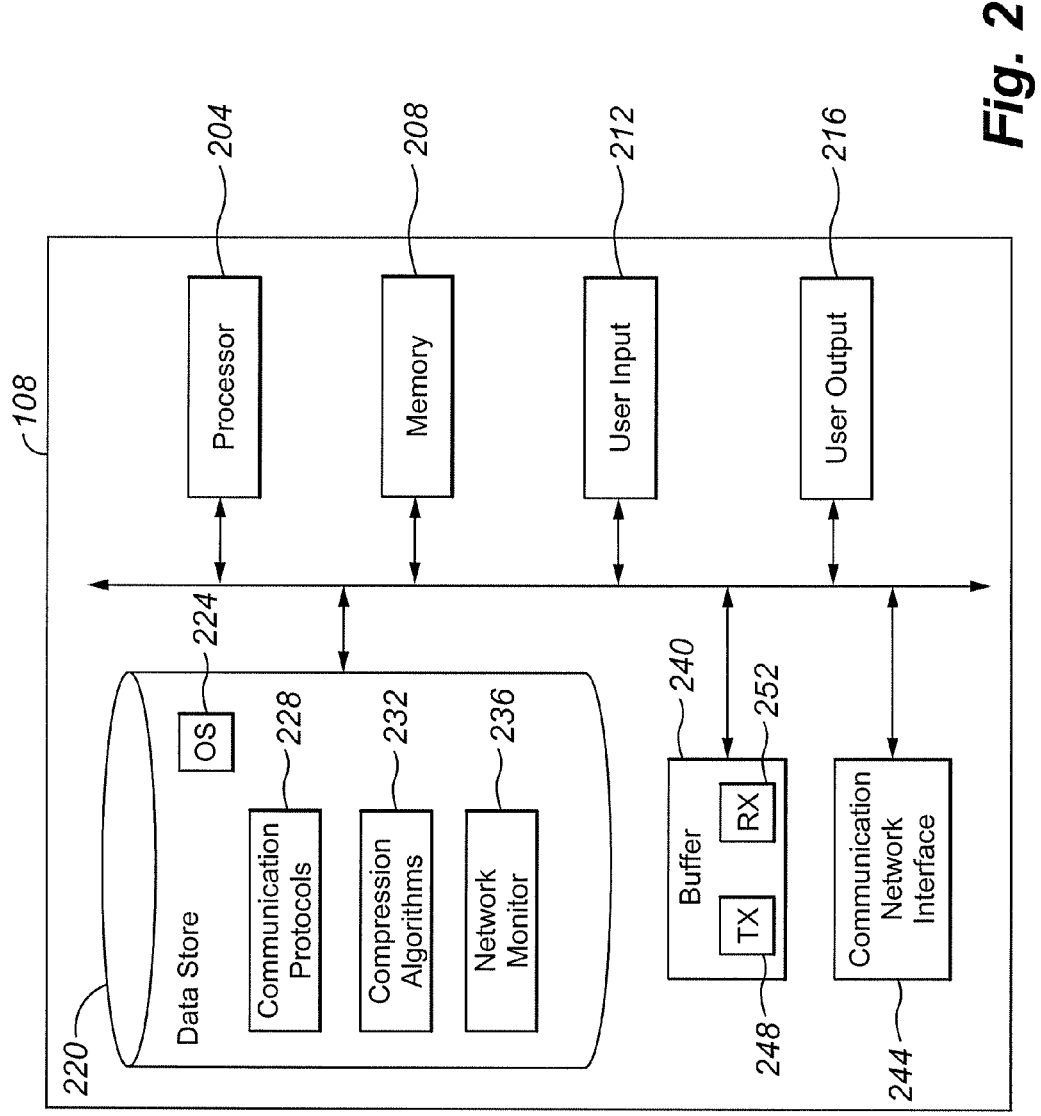
FIG. 2 is a block diagram depicting a communication device in accordance with embodiments of the present invention.

With reference now to FIG. 2, components of a communication device 108, such as a communications or computing device, are depicted in block diagram form in accordance with embodiments of the present invention. The components may include a processor 204 capable of executing program instructions. Accordingly, the processor 204 may include any general-purpose programmable processor, digital signal processor (DSP) or controller for executing application programming. Alternatively, the processor 204 may comprise a specially configured application specific integrated circuit (ASIC). The processor 204 generally functions to run programming code implementing various functions performed by the communication device 108.

A communication device 108 may additionally include memory 208 for use in connection with the execution of programming by the processor 204 and for the temporary or long-term storage of data or program instructions. The memory 208 may comprise solid-state memory resident, removable or remote in nature, such as DRAM and SDRAM. Where the processor 204 comprises a controller, the memory 208 may be integral to the processor 204. The memory 208 may be volatile and/or non-volatile memory.

In addition, the communication device 108 may include one or more user inputs 212 and one or more user outputs 216. Examples of user inputs 212 include, without limitation, keyboards, keypads, touch screens, touch pads, and microphones. Examples of user outputs 216 include, but are not limited to, speakers, display screens (including touch screen displays), and indicator lights. Furthermore, it can be appreciated by one of skill in the art that the user input 212 may be combined or operated in conjunction with a user output 216. An example of such an integrated user input 212 and user output 216 is a touch screen display that can both present visual information to a user and receive input selections from a user.

A communication device 108 may also include data storage 220 for the storage of application programming and/or data. In addition, operating system software 224 may be stored in the data storage 220. The data storage 220 may comprise, for example, a magnetic storage device, a solid-state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

The data storage 220 may further include communications protocols 228. The communication protocols 228 may comprise a listing of various protocols that the communication device 108 can employ to communicate over the communication network 104. For example, the communication protocols 228 may enable the communication device 108 to communicate using TCP, UDP, and/or any other type of IP transport protocol.

Compression algorithms 232 may also be included in the data storage 220. The compression algorithms 232 may include various video, audio, or other media compression algorithms. Examples of video compression algorithms include, without limitation, MPEG-1, MPEG-2, MPEG-4, MPEG-4/AVC, H.261, H.262, H.263, and H.264. Examples of audio compression algorithms that may be included in the compression algorithms 232 include, but are not limited to, MP3, MPEG-1 Layer II, AAC, G.711, G.722, G.723, G.726, G.728, G.729, G.729.1, or any variations thereof. As can be appreciated, image compression algorithms may also be included in the compression algorithms 232.

The data storage 220 may further include a network monitor application 236 for monitoring the status and performance of the communication network 104. The network monitor application 236 may monitor performance parameters similar to the network monitor 116. When the network monitor application 236 identifies that network 104 performance has degraded due to one or more parameters falling under a predetermined performance threshold, the network monitor 236 may signal the processor 204 to begin employing different communication protocols 228 as well as different compression algorithms 232. Additionally, when the processor 204 receives notice that the network performance is below a particular performance threshold, the processor 204 may begin to employ a buffer 240 in the transmitting mode if the communication device 108 is transmitting voice information as well as in the receiving mode if the communication device 108 is receiving voice information. When the user is speaking and therefore transmitting speech signals, the processor 204 may store data packets in a transmission buffer 248 until segments of a predetermined size are created. Then the segments can be transmitted across the communication network 104 to the receiving communication device 108. Also, a communication device 108 receiving data may store data packets in a receiving buffer 252 until segments of a predetermined size are created. After the segments have been reconstructed and the processor 204 can guarantee that most or all of the packets are accounted for, then the segment can be played to the user via the user output 216. Additionally, the packets corresponding to the segment played to the user may be deleted from the transmission buffer 248. In accordance with embodiments of the present invention, the size of the transmission buffer 248 and receiving buffer 252 may vary depending upon the network conditions. In other words, the relative size of the transmission buffer 248 and receiving buffer 252 may be dynamically altered depending upon who is talking and what the current conditions of the network 104 are. For example, if there is a first state of insufficient bandwidth available, then a TCP-like protocol may be employed with an equal amount of buffer space being available for the transmission 248 and receiving 252 buffers. When network 104 performance further degrades, then more buffer space may be allocated for the transmission buffer 248 in comparison to the receiving buffer 252. Alternatively, if it is determined that the other participant is doing most of the talking, then more space may be allocated to the receiving buffer 252 instead of the transmission buffer 248.

The user output 216 may also be used to display to each user the status of the conversation. In other words, the user output 216 may display the buffering status of the transmitting communication device 108 as well as the buffering status of the receiving communication device 108. Displaying the buffering status of both communication devices 108 allows both participants in a bidirectional conversation to know when they can speak and reduces potential problems associated with talkover. Buffering status for one communication device 108 may be transmitted to another communication device in data packets in addition to the packets carrying voice information. This allows one communication device 108 to be aware of the buffering status of the other communication device 108. Additionally, a communication device 108 associated with a non-speaking participant may transmit the status of its receiving buffer 252 back to the communication device 108 associated with the speaking participant. During this type of transmission, the receiving buffer 252 status is sent in packets that are not accompanied by packets carrying voice information. More specifically, one user output 216 may display the status of the transmission buffer 248 associated with the speaking participant's communication device 108 and the status of the receiving buffer 252 associated with the listening participant's communication device 108.

A communication device 108 may also include one or more communication network interfaces 244. Examples of communication network interfaces 244 include, but are not limited to, a network interface card, a modem, a wired telephony port, a serial or parallel data port, radio frequency broadcast receiver, a USB port, or other wired or wireless communication network interfaces.

Figure 3:
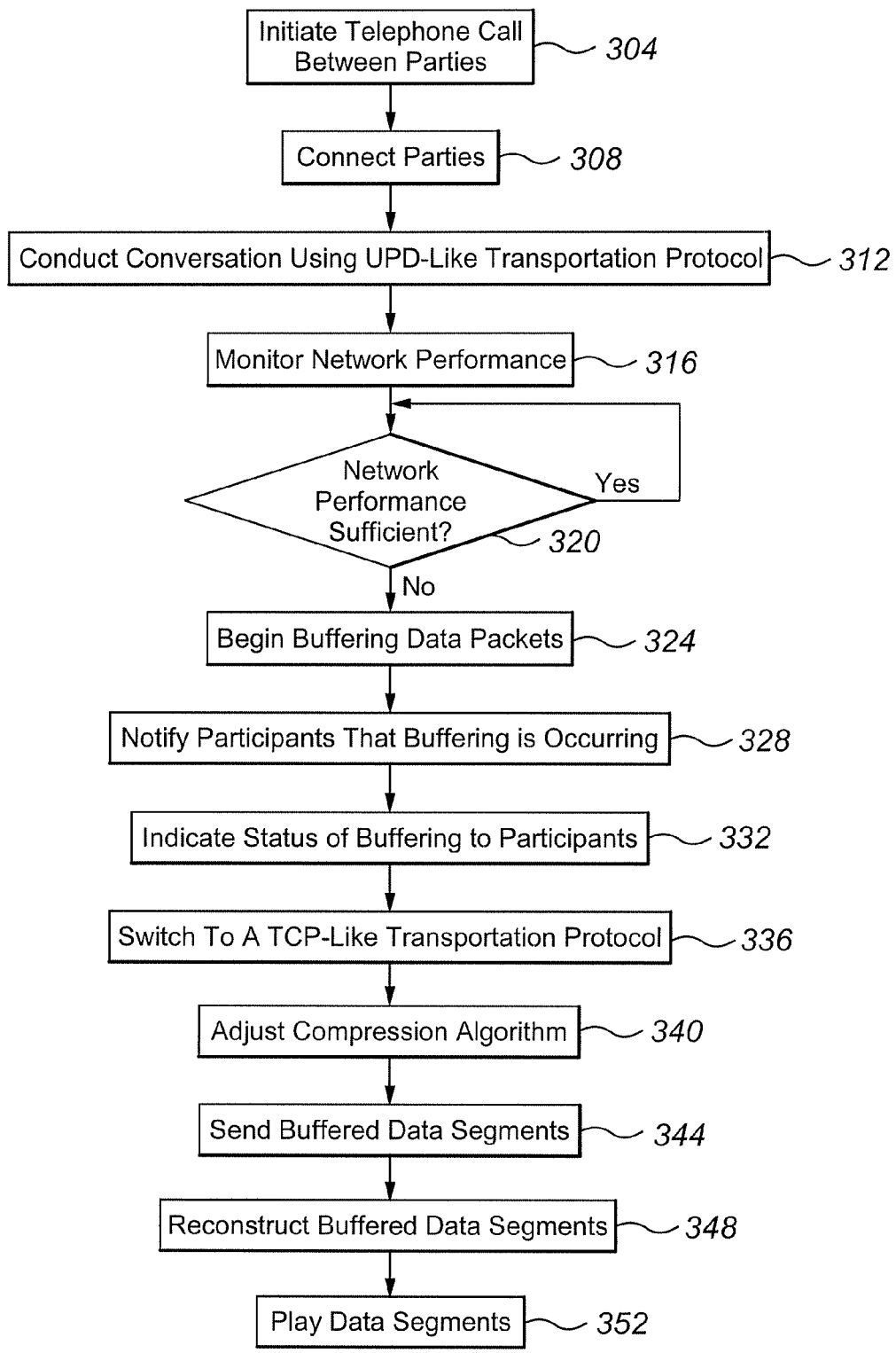
FIG. 3 is a flow chart illustrating a method for changing transportation protocols in response to a degradation of network quality during a VoIP conversation in accordance with embodiments of the present invention.

With reference now to FIG. 3, a method of conducting a bidirectional VoIP communication session will be described in accordance with at least some embodiments of the present invention. Initially, the method begins when a telephone call is initiated between parties (step 304). The telephone call may comprise voice data, image data, video data, and combinations thereof. In one embodiment, the participants to the communication session may both be human users interacting with one another. Of course, embodiments of the present invention are not precluded from non-human participants such as IVRs and the like. The telephone call may be initiated by the placement of an INVITE message from the calling communication device 108 to the receiving communication device 108 in the event that SIP is used to initiate the call. Alternatively, the call may be initiated by other known mechanisms.

After initiation, the communication devices 108 of each party are connected through the communication network 104 (step 308). Once connected, the parties can begin conducting a conversation using a UDP-like transportation protocol (step 312). A UDP-like transportation protocol is characterized by the fact that packet delivery reliability and ordering guarantees are not provided. Rather, a UDP-like transportation protocol will interpolate for lost packets rather than request retransmission of lost packets, thus making the UDP-like protocol useful in time-sensitive applications.

As the conversation progresses, a network monitor 116, 236 monitors the network 104 performance (step 316). As a part of monitoring network 104 performance, the network monitor 116, 236 may monitor various parameters of network 104 performance such as jitter, packet loss, packet delay, bandwidth availability, or other quality of service parameters. As the network monitor 236 monitors these parameters it continually determines if network performance is sufficient (step 320). The sufficiency of the network performance may be predefined and based on experimental data related to network performance. A threshold may be established such that if one or more or a combination of parameters are below a particular threshold, then the network 104 performance may be deemed insufficient. Alternatively, a threshold accounting for a weighted sum of the parameters may be employed to determine if the network performance is sufficient. In still other embodiment, a communication device 108 may be provided with a user input 212 that can be engaged by the conversation participant when the participant believes that the performance is too low and the conversation has become unintelligible. If the network 104 performance continues to stay above a certain threshold, then the conversation will continue with the UDP-like transportation protocol. However, if the network 104 performance becomes insufficient as determined either by the participant or by some predefined criteria, then transmitted packets start going into a buffer 120, 240 (step 324). As noted above, the buffering of the transmitted packets may occur at the receiving communication device 108, and/or on a switch/server 112 somewhere therebetween.

The packets are buffered into segments such that the segments can be replayed to a user in comprehensible chunks rather than being delivered to the user on a packet-by-packet basis as is typically done with UDP-like transportation protocols. Since the packets are being buffered, a delay will be introduced into the transmission of signals from the speaking participant to the receiving participant. For this reason, when buffering does begin, both participants are notified that buffering is taking place (step 328). The notification may be sent in an audible and/or visual form. Audible forms of notification include a beep or a message saying that buffering has begun. Visual forms of notification include illumination of a light or presenting a display to the participants. The notification is meant to alert the participants that the conversation will begin to be delayed and the participants may need to wait for a period of time before they begin to speak.

To further assist the participants in determining when the other participant is done speaking and the signals have been completely transmitted, the status of the buffering may be displayed to the participants via the user output 216 (step 332). Each participant may be shown the status of the sending participant's transmission buffer as well as the status of their own receiving buffer. Furthermore, each participant may also be presented with information related to their own transmission buffer and the other party's receiving buffer. For example, two bar graphs may be presented to each participant. The first graph may represent the number of packets that are currently stored in a buffer 120, 240 associated with the speaker, whereas the second graph may represent the number of packets that are stored in a buffer 120, 240 associated with the receiving participant. By displaying the number of packets in the buffer or some equivalent representation thereof, the listening participant will know approximately how long to wait before the speaker is finished. This also allows the listening participant to know that he/she is not speaking over the other participant. Other indications of buffering status may be provided to the participants such as the percentage of buffer 120, 240 filled with packets or the amount of time that is currently stored in the buffer 120, 240.

In one embodiment, communication devices 108 can send signals to one another indicating how much data remains to be sent (i.e., how much data is buffered). The indications require very little bandwidth and may be piggybacked with regular voice packets. The indications can be used to display to the participants information about the other end (e.g., that the other participant is speaking, how much speech has been received, how much is buffered for play, and how much remains to be transmitted). Participants may also be shown how much of their own speech has been sent and how much has been played. Additionally, the participants may be provided with network performance information, which can be used to understand why the signals are being buffered the way they are.

As a part of initiating packet buffering, the conversation may change from the UDP-like transportation protocol to the TCP-like transportation protocol where the retransmission of missing and/or unordered packets can be requested by the receiving end switch/server 112 and/or communication device 108 (step 336). Changing from the UDP-like protocol to the TCP-like protocol helps guarantee a higher level of signal transmission quality during times of insufficient network 104 quality. Of course, a user may be able to set thresholds that determine when the change from the UDP-like protocol to the TCP-like protocol should occur. The user-defined thresholds may also be disabled or changed by the user during a conversation if they wish to sacrifice conversation quality for latency.

To further enhance the quality of the conversation and efficiency with which network 104 bandwidth is used, the signals may be compressed while they are being buffered. Therefore, when the transportation protocols changes from the UDP-like protocol to the TCP-like protocol, the compression algorithms may be adjusted as well (step 340). The new compression algorithms may be chosen by the compression agent 124 and/or from the compression algorithms 232 stored on the communication device 108. The compression is typically performed at the transmitting end prior to transmission across the communication network 104. The compression of signals prior to transmission can help improve the conversation quality in terms of bandwidth used, improved error rates, and so on.

The communication equipment, including the communication devices 108 and switch/servers 112, also need to be notified that other devices have begun buffering data packets. When buffering begins, the format of the packets may change since additional information may be included in the packet header as a result of changing from the UDP-like protocol to the TCP-like protocol. Moreover, if the compression of the packets has changed, the receiving switch/server 112 and/or communication device 108 needs to be apprised of that fact so that the packets can be properly decompressed. Changing to a system where packets are buffered does not need to be synchronized between the communication devices 108, but each side of the conversation needs to be made aware of the actions of the other side. One communication device 108 may send a signal to the other communication device 108 to complete this notification. In an alternative embodiment, both communication devices 108 (or switch/servers 112) may have similar rules related to the thresholds associated with network 104 performance, such that both sides of the conversation will begin buffering and change from the UDP to the TCP-like protocol at substantially the same time. A buffer is built up at each end such that intelligible segments of the conversation can be transmitted and maintained at a time. Once the complete transmission of a given segment has been verified, then data from that segment may be deleted from the transmitting buffer 132, 248.

After an adequate amount of packets have been buffered into a segment, the data segment is transmitted across the communication network 104 (step 344). The packets are still transmitted individually as packets but the segment maintained in a buffer 120, 240 associated with the receiving participant until all of the packets associated with the sent segment are received and properly placed in order. For that reason, the packets are reconstructed in a buffer 120, 240 associated with the receiving participant until the segment is completely reconstructed (step 348). Once the segment has been reconstructed at the receiving end, the segment is played to the recipient (step 352). The segments may correspond to a complete word, a partial sentence, or even a complete sentence depending upon the size of the buffer 120, 240 and other considerations such as desired delay. In one embodiment silence detection mechanisms may be employed to detect when a word or sentence is completed, thereby helping determine how large a segment should be before it is played to the participant. Additionally, silence detection mechanism may be employed to determine when a participant is speaking and if a participant is speaking, then segments may not be maintained in the buffer until the participant is done speaking.

In accordance with one embodiment, if a communication device 108 or switch/server 112 detects that it is up to date with the conversation (e.g., that it has played all of the received data and transmitted all of the local data), then the communication device 108 may revert back to the UDP-like transportation protocol and attempt to use standard interpolation techniques to smooth over minor transmission problems.

Figure 4:
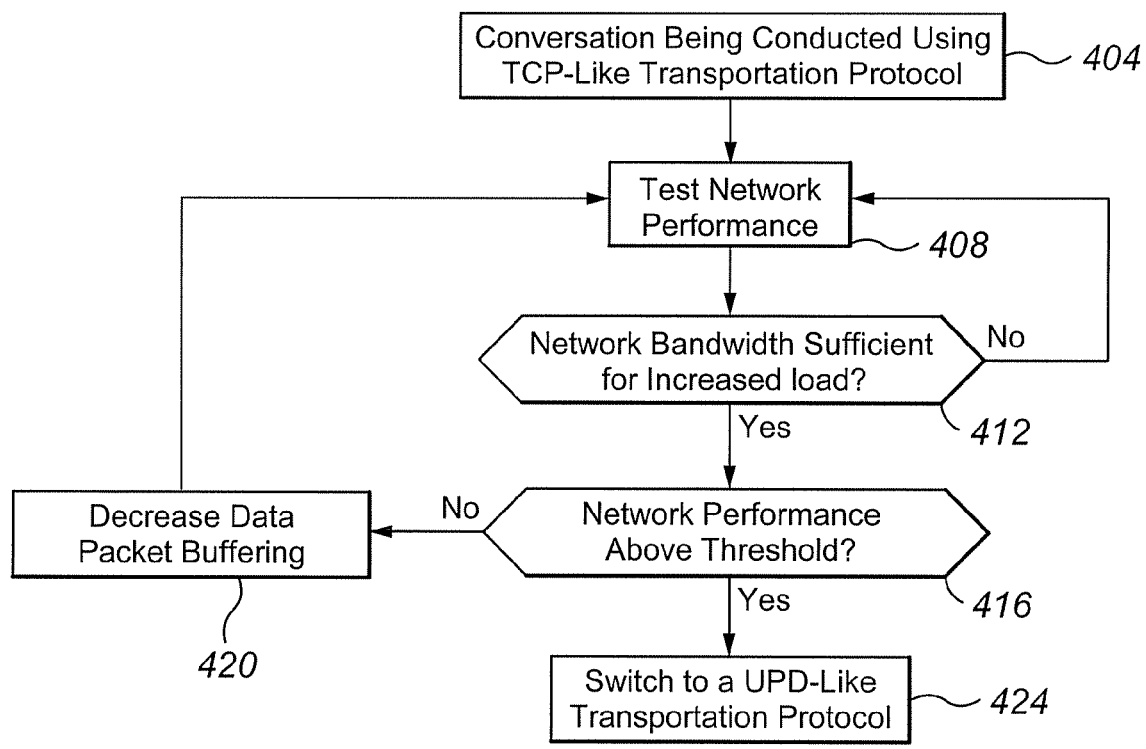
FIG. 4 is a flow chart illustrating a method for changing transportation protocols in response to an improvement of network quality during a VoIP conversation in accordance with embodiments of the present invention.

FIG. 4 depicts a method of changing back to a UDP-like transportation protocol in accordance with at least some embodiments of the present invention. The method begins as the conversation is being conducted using a TCP-like transportation protocol (step 404). The TCP-like protocol is intended for use while the performance of the communication network 104 is not sufficient to support real-time communication protocols such as a UDP-like protocol. An unfortunate side effect to buffering data packets and using a TCP-like communication protocol during a conversation is that conversations latency is introduced to ensure signal quality. Therefore, as the TCP-like protocol is being used, the performance of the communication network 104 will be continually tested by the communication devices 108 and/or the switch/servers 112 (step 408). The performance of the communication network 104 can be tested by sending test packets across the communication network 104. Alternatively, the communication devices 108 may attempt to send smaller segments more frequently, thereby utilizing more bandwidth. In one embodiment, the rate at which packets are sent may be increased to see if the communication network 104 can sustain the increased bandwidth usage. In still another alternative embodiment, the participants may engage the user input 212 and request to try the UDP-like protocol.

As the network performance is tested, it is determined whether there is sufficient network bandwidth to sustain the increased load (step 412). If the network 104 cannot handle the increased load, that is, if after testing it is determined that transmission quality would be greatly compromised if packets were sent more quickly, then the network 104 performance will continue to be tested (step 408). However, if the network 104 does pass the initial test, which may have included transmission of test packets or an increased data transmission rate, then it is determined if the network 104 performance (e.g., bandwidth), is above the predetermined parameter thresholds associated therewith (step 416). If the network 104 performance has increased somewhat but not enough to meet the thresholds of network 104 performance, then the buffering will continue but at a decreased rate (step 420) and the network 104 performance quality will continue to be tested (step 408). In other words, packets are sent at a higher rate but the TCP-like protocol is still employed and data buffering continues. However, if the network 104 performance meets the performance thresholds, then the communication endpoints 108 and/or switch/servers 112 will change to using a UDP-like transportation protocol and discontinue the buffering of data packets (step 424). U.S. Patent Publication No. 20040073641, filed on Apr. 15, 2004, the entire disclosure of which is hereby incorporated by reference, discloses a method of testing and identifying network 104 performance problems and also determining when such problems have subsided.

It is in the interest of each end to keep pushing the boundaries of the network 104 performance by ramping up packet usage and transmission rates until the transmission quality (i.e., number of lost packets, number of mis-ordered packets, number of late packets, jitter values) falls below the quality thresholds. The use of the TCP-like protocol should continue until both sides realize that the appropriate bandwidth is available and proper packet loss, jitter values, etc, associated with a normal connection can be obtained. However, the size and rate at which buffered segments are sent across the communication network 104 may be adjusted during the conversation in an attempt to maximize conversation quality and minimize conversation latency. The adjustments are generally made based upon the monitored network 104 performance.

The following example may be considered to further an understanding of embodiments of the present invention. Suppose that participants A and B are speaking to each other during a communication session at 30 Kbps. Occasional lost packets are filled in and jitter is automatically handled. Somewhere else in the communication network 104, a large file transfer begins, a router goes down, or three more calls start up. In response to this change in network usage, now only 10 Kbps of bandwidth is available. When this particular change occurred, suppose that participant A is speaking. The two communication devices 108 quickly realize (via the network monitor 116, 236) that packets are being lost. In response to this realization, the transmitting communication device 108 begin buffering A's voice at the transmission end. Additionally, the communication device 108 begins buffering A's voice at the receiving end. When the network performance worsens, B hears A's voice cut out, and B asks, "Are you still there?" This speech is buffered at B's communication device 108, and accumulates at A's end. B realizes that something is wrong and references the user output 216.

Instead of hearing chopped up packets, both participants hear silence and see a display that shows how much of their current speech is backlogged. The participants also see how much speech is waiting for them from the other participant. A finishes his sentence that was cut out, and stops talking to wait.

As A's sentence arrives at B's end, B has finished asking "Are you still there?" A's sentence is played for B. While this occurs, B's sentence "Are you still there?" arrives at A's end and A can see that it was said while his sentence was being transmitted to B. B can reply to A's sentence and begin the transmission of the new sentence. Now, A can see that B is talking and waits for the reply to his last sentence to be transmitted. While B's reply is being transmitted, the network conditions may be restored. B's sentence arrives at A's communication device 108 and is accordingly replayed. A starts talking and is immediately heard by B, at which point both participants can see that the delay is minimal and normal communications are possible again.

In accordance with one embodiment, it is a goal to ensure that when the network 104 is no longer capable of transmitting intelligible real-time speech, the VoIP system adapts by allowing as much delay as is necessary to restore intelligibility. In the process, advantages can be captured due to the delay tradeoff such as increasing the efficiency with which bandwidth is used. Also, participants are provided with the feedback they need to anticipate and cope with the delays in the conversation, until normal VoIP services are possible.

In one embodiment, the sending communication device 108 might also allow the participant to enable a push-to-talk system to indicate when they are talking. This particular feature may be useful in noisy environments and allows the participant more control over what is said. During periods of adequate network performance, the push-to-talk button may be used to lower bandwidth requirements and as a replacement for silence suppression. However, during periods of inadequate network performance, the push-to-talk button may be used to control segment size.

In accordance with one embodiment, speech analysis can also be used to display information to the participants relating to what the other participant has heard when they started talking. If the participants are able to avoid talking over one another, a comprehensible transcript may be generated using a speech-to-text (STT) mechanism. This will provide a much better indication at both ends of how the conversation is proceeding, while retaining the full nuances of audible speech. In cases of extremely poor network performance, the system may revert to a completely text-based system.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of communicating between communication devices over an IP-based communication network, comprising:
   transmitting data packets from a first communication device to a second communication device using a transportation protocol that does not retransmit at least one of lost and damaged data packets;
   determining performance parameters associated with performance of the communication network;
   determining that the performance parameters do not meet a threshold of performance for the communication network;
   in response to identifying that the performance parameters do not meet the threshold of performance, storing a number of received data packets in a buffer prior to providing the data packets to an intended recipient; and
   indicating to at least one of the first and second communication device that a number of data packets are being stored in the buffer.

2. The method of claim 1, further comprising displaying a status of buffering to a user of at least one of the first and second communication device.

3. The method of claim 2, wherein displaying comprises showing the user the number of data packets that are stored in the buffer and have not been provided to the intended recipient.

4. The method of claim 2, wherein the first communication device is associated with a speaking user and the second communication device is associated with a listening user, and wherein the status of buffering is displayed to both the speaking and listening user.

5. The method of claim 1, further comprising:
changing from the transportation protocol that does not retransmit at least one of lost and damaged data packets to a transportation protocol that provides for retransmission of at least one of lost and damaged data packets;
notifying the first and second communication devices that the transportation protocol has been changed;
identifying that a data packet has been at least one of lost and damaged;
requesting retransmission of the data packet; and
retransmitting the data packet.

6. The method of claim 1, further comprising:
storing data packets in a transmitting buffer until a segment has been formed;
after the segment has been formed, transmitting the data packets associated with the segment;
collecting the data packets in a receiving buffer until the segment has been reconstructed; and
after the segment has been reconstructed, providing the segment to the intended recipient.

7. The method of claim 6, wherein the segment comprises a user comprehensible amount of data.

8. The method of claim 6, wherein the segment comprises at least one of a word, a portion of a sentence, and a complete sentence.

9. The method of claim 1, wherein performance parameters associated with the performance of the communication network comprise at least one of jitter, packet loss, packet delay, and bandwidth availability.

10. The method of claim 9, wherein the threshold of performance comprises a weighted sum of the performance parameters.

11. The method of claim 1, further comprising adjusting compression algorithms for data packets stored in the buffer.

12. A computer readable medium comprising executable instructions operable to perform the method of claim 1.

13. A device for communicating over an IP-based communication network, comprising:
at least one receiving buffer;
a network monitor operable to monitor performance parameters of the communication network, wherein data packets are transferred from a transmitting communication device to the receiving communication device using a transportation protocol that does not retransmit lost or damaged data packets until the network monitor identifies that the performance parameters do not meet a threshold of performance for the communication network, and wherein in response to the network monitor identifying that the performance parameters do not meet the threshold of performance, a plurality of data packets are stored in the receiving buffer prior to being provided to a user associated with the receiving communication device; and
a user output capable of notifying at least one of the user associated with the receiving communication device and a user associated with the transmitting communication device that a number of data packets are being stored in the receiving buffer.

14. The device of claim 13, wherein the user output displays a status of buffering to both the user associated with the receiving communication device and the user associated with the transmitting communication device.

15. The device of claim 13, wherein in addition to storing a plurality of data packets in the receiving buffer, the transportation protocol is changed to a transportation protocol that provides for retransmission of lost or damaged data packets.

16. The device of claim 13, further comprising a transmitting buffer, wherein data packets are held in the transmitting buffer and transmitted after a segment has been formed, and wherein the data packets are collected and reconstructed into segments in the receiving buffer prior to being provided to the user associated with the receiving communication device.

17. The device of claim 16, wherein the segment comprises a user comprehensible amount of data.

18. The device of claim 13, wherein performance parameters associated with the performance of the communication network comprise at least one of jitter, packet loss, packet delay, and bandwidth availability.

19. A method of communicating between communication devices over an IP-based network, comprising:
transmitting data packets from a first communication device to a second communication device using a transportation protocol that allows retransmission of lost or damaged data packets;
storing a plurality of data packets in a buffer prior to providing the data packets to an intended recipient;
monitoring performance parameters associated with performance of the communication network;
identifying that the performance parameters at least one of meet and exceed a threshold of performance for the communication network; and
in response to identifying that the performance parameters at least one of meet and exceed the threshold of performance, discontinuing use of the buffer.

20. The method of claim 19, further comprising notifying at least one of a user associated with the first communication device and a user associated with the second communication device that the user of the buffer has been discontinued.

21. The method of claim 19, further comprising changing from the transportation protocol that allows retransmission of lost or damaged data packets to a transportation protocol that does not retransmit lost or damaged data packets.

22. The method of claim 19, further comprising testing the communication network performance as a part of monitoring performance parameters.

* * * * *